United States Patent
Hauth (10) Patent No.: US 10,826,089 B2
(45) Date of Patent: Nov. 3, 2020

(54) MEASURING METHOD AND MEASURING APPARATUS FOR DETERMINING THE RECIRCULATION RATE

(71) Applicant: AVL List GmbH, Graz (AT)

(72) Inventor: Martin Hauth, Graz (AT)

(73) Assignee: AVL List GmbH, Graz (AT)

( * ) Notice: Subject to any disclaimer, the term of this patent is extended or adjusted under 35 U.S.C. 154(b) by 185 days.

(21) Appl. No.: 15/776,790

(22) PCT Filed: Nov. 16, 2016

(86) PCT No.: PCT/EP2016/077873
§ 371 (c)(1),
(2) Date: May 17, 2018

(87) PCT Pub. No.: WO2017/085133
PCT Pub. Date: May 26, 2017

(65) Prior Publication Data
US 2018/0375131 A1    Dec. 27, 2018

(30) Foreign Application Priority Data
Nov. 17, 2015 (AT) .................................. A 735/2015

(51) Int. Cl.
*H01M 8/0438* (2016.01)
*H01M 8/0432* (2016.01)
(Continued)

(52) U.S. Cl.
CPC ... *H01M 8/04388* (2013.01); *H01M 8/04014* (2013.01); *H01M 8/04097* (2013.01);
(Continued)

(58) Field of Classification Search
CPC ......... H01M 8/04388; H01M 8/04097; H01M 8/04014; H01M 8/04992; H01M 8/04328;
(Continued)

(56) References Cited

U.S. PATENT DOCUMENTS

2008/0152972 A1* 6/2008 Igarashi ............ H01M 8/04022
429/410
2009/0280366 A1* 11/2009 Baaser ............... H01M 8/04753
429/410
(Continued)

FOREIGN PATENT DOCUMENTS

CN   103401007   11/2013
CN   103563147    2/2014
(Continued)

OTHER PUBLICATIONS https://en.wika.com/newscontentgeneric.WIKA?AxID=4259 (Year: 2020).*
(Continued)

*Primary Examiner* — Lisa S Park (57) ABSTRACT

The invention relates to a measuring method for determining the recirculation rate (RR) in the anode gas circuit (50) of a fuel cell system (1) with fuel cell (10), wherein an anode gas (52) from an anode chamber (13) is supplied to the fuel cell (10) by means of a gas conveying device (70) via an anode gas recirculation line (51) and thermostated in an anode gas heat exchanger (60) arranged in the anode gas recirculation line (51). The following method steps are carried out for this purpose:
measuring a first differential pressure loss ($\Delta P_{1\_2}$) along a first line section (101) of the anode gas recirculation line (51) through which a first mass flow ($M_{1\_2}$) flows in the operating state of the fuel cell system (1);
measuring a second differential pressure loss ($\Delta P_{3\_4}$; $\Delta P_{2\_3}$) along a second line section (102; 103) of the anode gas recirculation line (51), which is being flowed through in the operating state by a second mass flow ($M_{3\_4}$; $M_{2\_3}$) of different size than the first mass flow ($M_{1\_2}$);
(Continued)

calculating the differential pressure loss ratio ($R_{\Delta P}$) by quotient formation from second ($\Delta P_{3\_4}$; $\Delta P_{2\_3}$) to first measured differential pressure loss ($\Delta P_{1\_2}$);

determination of the recirculation rate (RR) in the anode gas circuit (50) using a characteristic system curve (S) as a function of the respective calculated differential pressure loss ratio ($R_{\Delta P}$).

16 Claims, 4 Drawing Sheets

(51) Int. Cl.
*H01M 8/04992* (2016.01)
*H01M 8/04089* (2016.01)
*H01M 8/04014* (2016.01)
*H01M 8/0612* (2016.01)

(52) U.S. Cl.
CPC ... *H01M 8/04328* (2013.01); *H01M 8/04402* (2013.01); *H01M 8/04992* (2013.01); *H01M 8/0618* (2013.01)

(58) Field of Classification Search
CPC .......... H01M 8/04402; H01M 8/0618; H01M 8/04432; H01M 8/04753; H01M 2008/1293
See application file for complete search history.

(56) References Cited

U.S. PATENT DOCUMENTS

| | | |
|---|---|---|
| 2009/0280373 A1 | 11/2009 | Baaser et al. |
| 2012/0174990 A1 | 7/2012 | Yasuda |
| 2015/0147665 A1* | 5/2015 | Ruokomaki ........ H01M 8/0618 429/415 |
| 2016/0104906 A1* | 4/2016 | Wang ................... G05D 7/0635 429/419 |

FOREIGN PATENT DOCUMENTS

| | | |
|---|---|---|
| CN | 104106166 | 10/2014 |
| DE | 102009019838 | 12/2009 |
| WO | WO 2008/034454 | 3/2008 |

OTHER PUBLICATIONS

International Preliminary Report on Patentability dated May 31, 2018 From the International Bureau of WIPO Re. Application No. PCT/EP2016/077873 and its Translation Into English. (18 Pages).
Internationaler Recherchenbericht and Schriftlicher Bescheid [International Search Report and the Written Opinion] dated Feb. 9, 2017 From the Internationalen Recherchenbehörde [International Searching Authority] Re. Application No. PCT/EP2016/077873. (12 Pages).
Summary of Intention to Grant dated Dec. 13, 2016 From the Austrian Patent Office Re. Application No. A 735/2015.
Summary of Preliminary Notice dated Sep. 22, 2016 From the Austrian Patent Office Re. Application No. A 735/2015.

* cited by examiner

MEASURING METHOD AND MEASURING APPARATUS FOR DETERMINING THE RECIRCULATION RATE

RELATED APPLICATIONS

This application is a National Phase of PCT Patent Application No. PCT/EP2016/077873 having International filing date of Nov. 16, 2016, which claims the benefit of priority of Austrian Patent Application No. A 735/2015 filed on Nov. 17, 2015. The contents of the above applications are all incorporated by reference as if fully set forth herein in their entirety.

FIELD AND BACKGROUND OF THE INVENTION

The invention concerns a measuring method for determining the recirculation rate in the anode gas circuit of a fuel cell system, which fuel cell system comprises at least one fuel cell with at least one cathode arranged in a cathode chamber, with at least one anode arranged in an anode chamber and with an electrolyte present between cathode chamber and anode chamber, wherein anode gas from the anode chamber of the at least one fuel cell with at least one gas conveying device is supplied by an anode gas recirculation line and the anode gas is thermostated in at least one anode gas heat exchanger arranged in the anode gas recirculation line. Furthermore, the invention concerns a measuring apparatus for carrying out the inventive measuring procedure.

A fuel cell system, which is used in particular as an auxiliary power supply device in motor vehicles or as a "stationary power plant", usually comprises at least one fuel cell for generating electrical power from cathode air and reformate gas. Such a fuel cell is usually composed of a large number of individual fuel cell elements, which are stacked on top of each other and are called fuel cell stacks. To generate reformate gas, the fuel cell system can be equipped with a reformer that generates the reformate gas from a fuel, usually a hydrocarbon such as natural gas, as well as from reformer air and/or water vapor. The reformate gas then contains hydrogen gas and carbon monoxide. The reformation can take place in a separate reformer or in the fuel cell itself. The fuel cell system can also be equipped with an air supply device which draws in ambient air from an environment of the fuel cell system by means of an air conveyor device and subdivides it, for example, into reformer air and cathode air. The reformer air can then be supplied to the reformer via a reformer air line, while the cathode air can be supplied to the cathode side of the at least one fuel cell via a cathode air line. Usually, in a fuel cell system of this type, it is planned to guide anode gas of an anode side of the at least one fuel cell in the direction of the reformer by means of a recirculation line in order to be able to return anode exhaust gas from the respective fuel cell to the reformer. To drive the anode exhaust gas, a gas conveying device for conveying hot anode exhaust gas is usually arranged in the recirculation line, wherein a recirculation pump or a jet pump called an ejector is used for this purpose.

For the optimal operation of such a fuel cell it is necessary to obtain precise information about the recirculation rate of the recirculated anode exhaust gas. This makes it possible to determine how much of the water required for the reforming processes is supplied via recirculation and to prevent undesirable carbon formation, which occurs in particular when a solid oxide fuel cell is used as a fuel cell and this is operated directly with methane gas. Furthermore, it is possible to increase the utilization rate of the fuel.

According to the state of the art, the recirculation rate is usually determined with an additional pressure gauge, with which the pressure in flowing media or fluids can be determined according to the peculiarities of the Bernoulli equations. Examples are flow apertures, pitot tubes or Venturi nozzles of per se known pressure gauges. Such a pressure gauge is arranged in the recirculation line in order to obtain information on the recirculation rate by means of the resulting pressure difference. Usually a Venturi tube is used for this, whereby conclusions on the recirculation rate can be drawn by measuring the measurable pressure difference occurring via the Venturi tube according to the Bernoulli principle. However, the disadvantage is that the additional pressure gauge or Venturi tube causes an additional considerable pressure loss in the recirculation line of the anode exhaust gas. This is particularly the case when you want to cover a particularly large measuring range with a single pressure gauge: In order to enable reliable measurement of the pressure gauge even at low mass flows, an at least small, measurable pressure difference must be achieved, which requires relatively small free flow cross-sections in the flow aperture or in the Venturi tube of the pressure gauge, which, however, lead to a considerable pressure loss in the recirculation line at high mass flows. Another disadvantage is that such an additional pressure gauge causes additional costs and increases the space requirement of the recirculation line, not least because of the usually longer inlet section, which is necessary for reliable pressure differential measurement by means of a Venturi tube, in order to achieve the most even, directed inflow of the pressure gauge in the recirculation pipe.

Another major disadvantage of using an additional pressure gauge, such as a Venturi tube, is that in order to reliably determine the recirculation rate in the anode circuit by interpreting the pressure difference, an exact knowledge of the gas composition of the anode exhaust gas flowing through the pressure gauge is additionally required. Since the gas composition is difficult to determine during operation, an exact determination of the recirculation rate is also difficult.

SUMMARY OF THE INVENTION

It is therefore the task of this invention to provide a reliable and simple measuring method for determining the recirculation rate in the anode circuit of a fuel cell, which avoids the disadvantages of the state of the art described above. Furthermore, it is the task of the present invention to provide an appropriate measuring apparatus for carrying out the measurement method in accordance with the invention.

According to the invention, the first task, namely to provide an improved measuring method, is solved by a generic measuring method for determining the recirculation rate in the anode gas circuit of a fuel cell system by following the following method steps:

measuring a first differential pressure loss along a first line section of the anode gas recirculation line, which first line section is passed through by a first mass flow in the operating state of the fuel cell system;

measuring a second differential pressure loss along a second line section of the anode gas recirculation line, which second line section is passed through by a second mass flow of different size compared to the first mass flow in the operating state of the fuel cell system;

calculating the differential pressure loss ratio by quotient formation of the ratio of measured second differential pressure loss to measured first differential pressure loss;

determining the recirculation rate in the anode gas circuit using a characteristic system characteristic curve of the fuel cell system as a function of the respective calculated differential pressure loss ratio.

Particularly preferred designs and further embodiments of the inventive measuring method or of the inventive measuring apparatus are subject of the dependent claims respectively.

According to the invention, the pressure conditions at various points of the anode gas recirculation line are used. This takes advantage of the fact that with increasing current load requirements during operation of the fuel cell system, changes occur in the mass flow downstream of the anode. Due to the current load requirement, oxygen ions pass from the cathode, at which oxygen excess prevails, through a membrane separating the cathode chamber from the anode chamber into the anode chamber, where they react with the hydrogen present there to form water vapor, which is then additionally present after the anode outlet and thus increases the mass flow in the anode gas recirculation line downstream of the anode chamber.

On the one hand, a first differential pressure loss is measured along a first line section of the anode gas recirculation line, with a first mass flow flowing through the first line section during operation of the fuel cell system. For example, the measurement of the first differential pressure loss in the anode gas supply line, i.e. the inlet side of the anode chamber, is carried out as a two-point differential pressure measurement upstream and downstream of the anode gas heat exchanger on its comparatively cold heat exchanger side.

A second differential pressure loss along a second line section of the anode gas recirculation line is measured essentially simultaneously, this second line section being flowed through by a second mass flow of different size during operation of the fuel cell system, i.e. larger or smaller than the first mass flow in the first line section.

For example, the measurement of the second differential pressure loss in the anode gas discharge line, i.e. the outlet side of the anode chamber, is carried out as a two-point differential pressure measurement upstream and downstream of the anode gas heat exchanger on its comparatively hot heat exchanger side.

With increasing current load, for example, the mass flow on the anode output side becomes larger relative to the mass flow on the anode input side, since with increasing current load, the mass flow of oxygen, which passes from the cathode through the electrolyte into the anode chamber and is additionally transported to the anode gas flow in the anode gas discharge line, also increases. The two differential pressure losses, which are determined, for example, via the heat exchanger, behave in the same way.

Surprisingly, it has now been shown that, independently of the load requirement, there is a correlation between the differential pressure loss ratio, which is calculated as the quotient of the second differential pressure loss—determined, for example, at a comparatively higher mass flow— to the first differential pressure loss—at a comparatively lower mass flow—and the recirculation rate. This makes it possible to control the gas delivery device, for example a recirculation pump, in such a way that the desired recirculation rate in the anode gas circuit can be set using the differential pressure loss ratio calculated or measured in this way.

Up to now it was necessary for determining a complete characteristic map to measure the correlation between the pressure loss across an additional pressure gauge and the associated mass flow for different current loads and to correlate it with the individual recirculation rates. The recirculation pump could then be readjusted during operation, if the pressure loss at any point of the anode gas recirculation line and the current load was known, in order to achieve the desired recirculation rate. In addition to the determination of the flow-load-dependent pressure increase via the additional pressure gauge and the temperature determination in the anode gas, the respective gas composition of the anode gas also had to be determined, which is quite possible within the scope of a calibration but is extremely complex and impractical for the determination of the recirculation rate in real operation.

The invention now allows a rapid control of the recirculation rate without additional components in the anode gas recirculation line. One of the advantages of the invented method is that due to the correlation between pressure difference and recirculation rate, which is independent of the current load, calibration only has to be carried out for one current load range.

In a measuring method according to the invention, the characteristic system characteristic curve, as a correlation between the differential pressure loss ratio and the recirculation rate can advantageously be essentially independent of a current load. In this variant of the inventive measuring method, the recirculation rate in the anode gas circuit is determined using a characteristic system characteristic curve of the fuel cell system, which is independent of the current load or which is assumed to be essentially independent of the current load. This means that it is not necessary to vary the measurements at different current loads when determining the characteristic system characteristic curve. Only several different value pairs of differential pressure loss ratios and the corresponding recirculation rates must be determined, which serve as support points for determining the characteristic system characteristic curve of the respective fuel cell system.

In an inventive measuring method, the characteristic system characteristic curve can indicate a linear correlation between the differential pressure loss ratio and the recirculation rate. In this further embodiment of the measuring method, the correlation between the differential pressure loss ratio and the recirculation rate is assumed to be linear. The characteristic system characteristic curve is thus formed by a linear function or described by a linear function. To determine the linear characteristic system characteristic curve, no variations of the measurements at different current loads are necessary, and only two points of the linear characteristic system characteristic curve with different pairs of values of differential pressure loss ratios and the corresponding recirculation rates must be determined.

The differential pressure loss ratio can expediently decrease along the characteristic system characteristic curve with increasing recirculation rate in a measuring method according to the invention. In this variant of the measuring method, the characteristic system characteristic curve represents an indirectly proportional ratio of recirculation rate and corresponding differential pressure loss ratio.

In an inventive measuring method, the characteristic system characteristic curve for a fuel cell system can be calibrated respectively by determining the differential pressure loss ratios at different recirculation rates.

In a preferred embodiment, the first differential pressure loss along a first line section can be measured in the anode gas supply line on the cold heat exchanger side of the at least one anode gas heat exchanger in an inventive measuring method and the second differential pressure loss along a second line section can be measured in the anode gas discharge line on the hot heat exchanger side of the same anode gas heat exchanger. In this embodiment, both differential pressure losses are advantageously measured on the cold or hot heat exchanger side of the same heat exchanger.

In a further embodiment, the first differential pressure loss can be measured in the anode gas supply line on the cold heat exchanger side upstream and downstream of the at least one anode gas heat exchanger and the second differential pressure loss can be measured in the anode gas discharge line on the hot heat exchanger side upstream and downstream of the same anode gas heat exchanger. In this embodiment, both differential pressure losses are advantageously measured on the cold or hot heat exchanger side before and after the same heat exchanger. The obtained differential pressure loss ratio is thus determined on a single component—the heat exchanger in the anode gas recirculation line.

In an alternative embodiment, the first differential pressure loss can be measured in the anode gas supply line on the cold heat exchanger side upstream and downstream of the at least one anode gas heat exchanger and the second differential pressure along a second section can be measured of the anode gas recirculation line upstream and downstream of the anode chamber. In this embodiment, the first differential pressure loss in the anode gas supply line upstream and downstream of the heat exchanger is compared with the second differential pressure loss upstream and downstream of the anode chamber. Thus, in this embodiment, the pressure losses of the heat exchanger and the anode chamber of the fuel cell are compared in order to determine the differential pressure loss ratio.

In a further embodiment of the invention, anode gas can be supplied to a reformer with the at least one gas delivery device in a measuring method.

The additional task of the present invention, to provide a corresponding measuring apparatus for carrying out the inventive measuring method, is solved according to the invention by a measuring apparatus which comprises at least one first differential pressure loss measuring unit for determining a first differential pressure loss, which is measured with two spaced apart pressure measuring points, positioned along a first line section of an anode gas recirculation line, wherein in the operating state of the fuel cell system a first mass flow flows through the first line section, and comprising at least a second differential pressure loss measuring unit for determining a second differential pressure loss which is measured with two spaced apart pressure measuring points, positioned along a second line section of the anode gas recirculation line, wherein in the operating state of the fuel cell system the second line section has been passed through by a second mass flow, which second mass flow is of different size to the first mass flow of the first line section, and further comprising an arithmetic unit, wherein a differential pressure loss ratio can be calculated from the arithmetic unit by quotient formation of the ratio of measured second differential pressure loss to measured first differential pressure loss, and further comprising an evaluation unit, wherein based on the calculated differential pressure loss ratio and a characteristic system characteristic curve of the fuel cell system as a function of the respective calculated differential pressure loss ratio the respective recirculation rate can be determined by the evaluation unit, which recirculation rate can be displayed by a display unit.

In an advantageous embodiment of the inventive measuring apparatus, the arithmetic unit, the evaluation unit and the display unit can be coupled to each other with signal lines. In this embodiment of the measuring apparatus, the individual arithmetic, evaluation and display units are each coupled with signal lines. These units are also advantageously arranged together within one housing of the measuring apparatus or integrated into such a housing. Thus, a measuring apparatus is provided with which the respective recirculation rate of the anode gas circuit can be determined and also displayed.

In a measuring apparatus according to the invention, it may be expedient to calibrate the characteristic system characteristic curve for a fuel cell system by determining the differential pressure loss ratios at different recirculation rates.

The characteristic system characteristic curve of an inventive measuring apparatus can be advantageously selected with a correlation between the differential pressure loss ratio and the recirculation rate independent of a current load.

In an alternative embodiment of the invention of a measuring apparatus, the characteristic system characteristic curve can be selected with a linear correlation between the differential pressure loss ratio and the recirculation rate.

BRIEF DESCRIPTION OF THE SEVERAL
VIEWS OF THE DRAWINGS

Further details, features and advantages of the invention arise by the following explanation of schematically shown examples in the figures. The figures show.

DESCRIPTION OF SPECIFIC EMBODIMENTS
OF THE INVENTION

Figure 1:
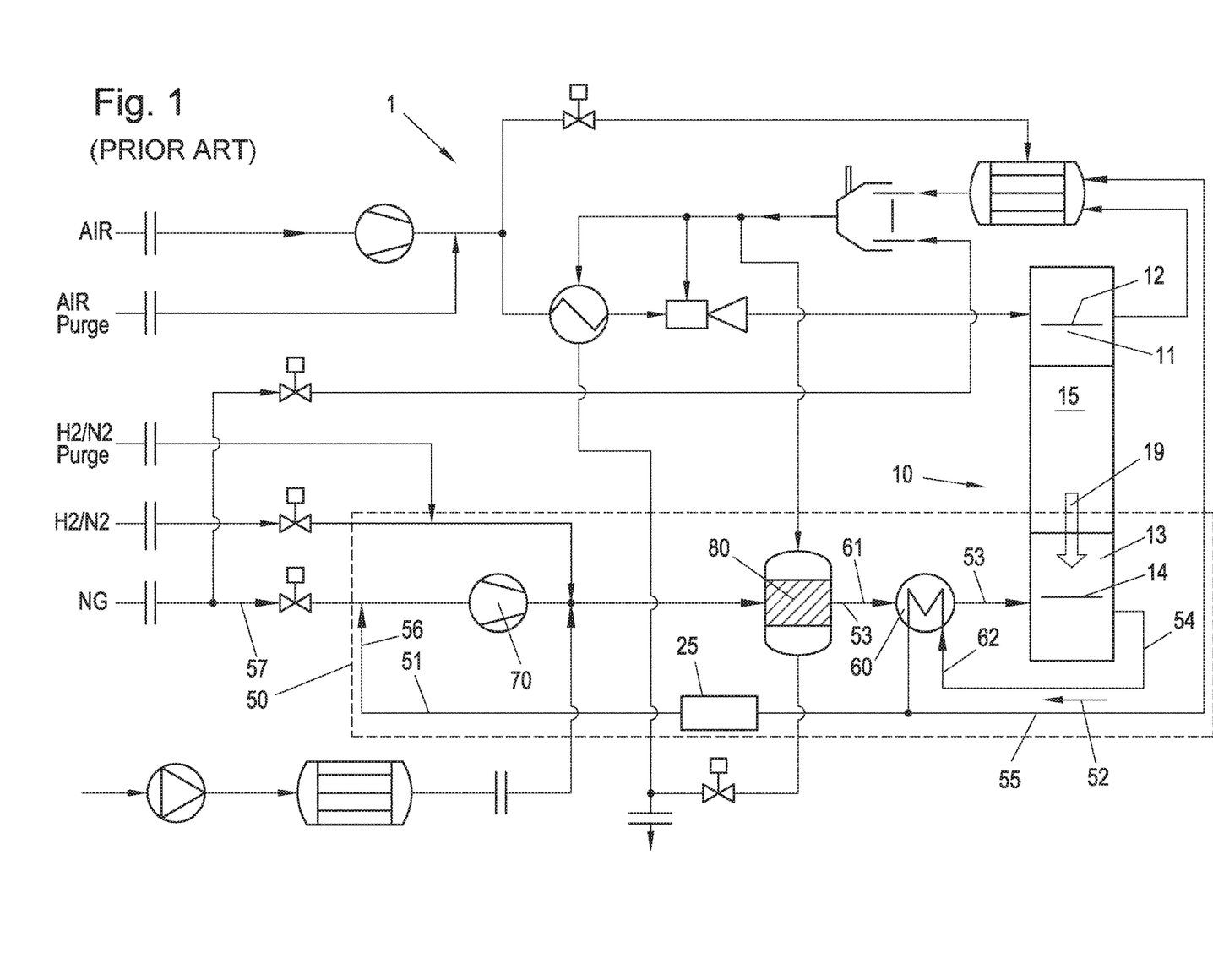
FIG. 1 in a method flow diagram, a state-of-the-art fuel cell system, wherein an additional pressure measuring apparatus for determining a characteristic pressure loss is being provided in an anode gas circuit.

FIG. 1 shows a state-of-the-art fuel cell system 1 in a schematic method flow diagram, wherein at least one fuel cell 11 with at least one cathode 12 arranged in a cathode chamber 11, with at least one anode 14 arranged in an anode chamber 13 and with an electrolyte 15 present between cathode chamber 11 and anode chamber 13 are being provided. During operation oxygen 19, which is symbolized by an arrow 19, flows from the cathode through the electrolyte 15 into the anode chamber 13. An additional pressure gauge 25, for example a Venturi tube 25, is provided in the anode gas circuit 50 to determine the recirculation rate. In addition to the additional pressure gauge 25, which is installed in a recirculation line 51 of the anode gas 52, the anode gas circuit 50 also comprises a circuit section designated as anode gas supply line 53, wherein the anode gas supply line 53 is oriented at the inlet side to the anode chamber 13 and a circuit section designated as anode gas discharge line 54, which leads away from the anode chamber 13 at the outlet side. The anode gas discharge line 54 branches in downstream anode gas direction 51 after the anode chamber 13 into an anode gas discharge flow 55 and into an anode recycling gas flow 56, wherein the anode recycling gas 56 is recycled and mixed with fresh fuel 57 and this mixture in turn is supplied in the anode gas supply line 53 to the anode chamber 13.

As an example, a fuel cell system 1 with a so-called solid oxide fuel cell (SOFC) 10 is shown in FIG. 1. This is a high-temperature fuel cell which is operated at operating temperatures of approximately 650° to 1000° C. The electrolyte 15 of this cell type consists of a solid ceramic material which is able to conduct oxygen ions but has an insulating effect for electrons. The electrodes, cathode 12 and anode 14, are attached to both sides of electrolyte layer 15. They are gas-permeable electrical conductors. The oxygen ion conducting electrolyte 15, for example, is designed as a thin membrane to transport the oxygen ions with little energy. It only works at high temperatures. The outer side of cathode 12 facing away from the electrolyte is surrounded by air, the outer anode side 14 by fuel gas. Unused air, unused fuel gas and combustion products are extracted.

Solid oxide fuel cells 10 are galvanic cells for continuous electrochemical power generation, which are usually operated as fuel cell stacks, so-called SOFC stacks, i.e. as interconnection of several fuel cells 10. For a better overview, only one single fuel cell 10 is illustrated in FIG. 1. SOFC fuel cell systems 1 also include corresponding heat exchangers, such as those shown in FIG. 1, which serve to preheat the anode gas 52 in the anode gas supply line 53, i.e. on the cold heat exchanger side 61, by heat exchange in reverse flow with the hot anode gas 52 in the anode gas discharge line 54 on the hot heat exchanger side 62. Furthermore, such a fuel cell system 1 comprises a gas delivery device 70 in the anode gas circuit 50, a reformer 80 as well as further modules such as for an example a DC/AC inverter, a corresponding control system and other components which are necessary for the largely or completely automatic operation of the fuel cell system 1. The Reformer 80 is used to produce a reformate gas from a combustible material fuel 57 or other fuel, usually a hydrocarbon such as natural gas (NG) and from reformer air and/or water vapor. The reformate gas then contains hydrogen gas and carbon monoxide.

The function of every galvanic cell and of every electrochemical reaction in general is based on a redox reaction in which reduction and oxidation take place separately, namely at the boundary between electrode and electrolyte. In the solid oxide fuel cell 10, this redox reaction is a reaction of oxygen with the fuel, which can be hydrogen, but in this case also contains carbon monoxide, for example. On the cathode side 12 there is an excess of oxygen, while on the anode side 14 there is a lack of oxygen because the oxygen present reacts directly with the hydrogen present, for example. This concentration gradient causes oxygen 19 to diffuse from cathode 12 through electrolyte 15 to anode 14, but electrolyte 15 in between is only permeable to oxygen ions. Once the oxygen molecule has reached the boundary between cathode and electrolyte, it absorbs two electrons, becomes an ion and can penetrate the barrier. When it reaches the anode 14 boundary, it reacts catalytically with the fuel gas, releasing heat and the corresponding combustion products, and releases two electrons to the anode. The prerequisite for this is a current flow—the actual purpose of the solid oxide fuel cell—wherein the current flow can be used elsewhere.

The chemical reactions taking place at the anode 14, the cathode 15 and the total reaction via both electrodes of the fuel cell can therefore be noted as follows:

$$H2+O2{-}{\rightarrow}H2O+2e- \qquad \text{Anode}$$

$$\tfrac{1}{2}O2+2e-{\rightarrow}O2- \qquad \text{Cathode}$$

$$2H2+O2 \rightarrow 2H2O \qquad \text{Total reaction}$$

Figure 2:
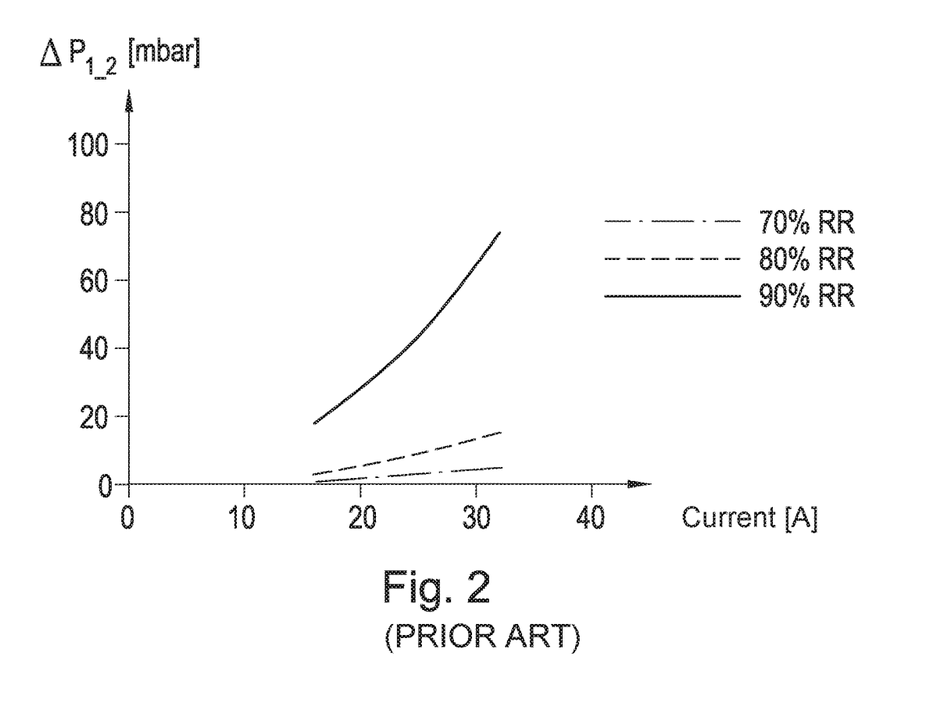
FIG. 2 in a diagram, a state-of-the-art method for determining the recirculation rate, wherein the characteristic pressure losses determined with the additional pressure gauge in the anode gas circuit are being plotted as a function of the current loads at different recirculation rates.

As already explained in detail at the beginning and illustrated in FIG. 2, in order to determine the recirculation rate in the anode gas circuit 50, it has so far been necessary to record certain characteristic pressure losses with the additional pressure gauge 25 in the anode gas circuit 50 as a function of the different current loads at different recirculation rates RR. For example, the characteristic pressure loss $\Delta P_{1\_2}$ was generated and measured using a Venturi tube 25 installed in the anode gas circuit 50. In addition to the additional pressure loss in the anode gas circuit 50 due to the additional pressure measuring instrument 25 required to determine the recirculation rate, the necessity of knowledge of the gas composition of the anode gas 52 is also disadvantageous. Therefore, the characteristic curves in FIG. 2, which show the correlation between characteristic pressure loss $\Delta P_{1\_2}$ and current at different recirculation rates of 70%, 80% and 90% respectively, are also depend on the temperature of the anode gas and its gas composition at the respective pressure measurement point. Therefore, for this conventional measuring principle, an extensive characteristic map for the entire operating range of the fuel cell system 1 must be determined, which is very complex and also inaccurate.

Figure 3:
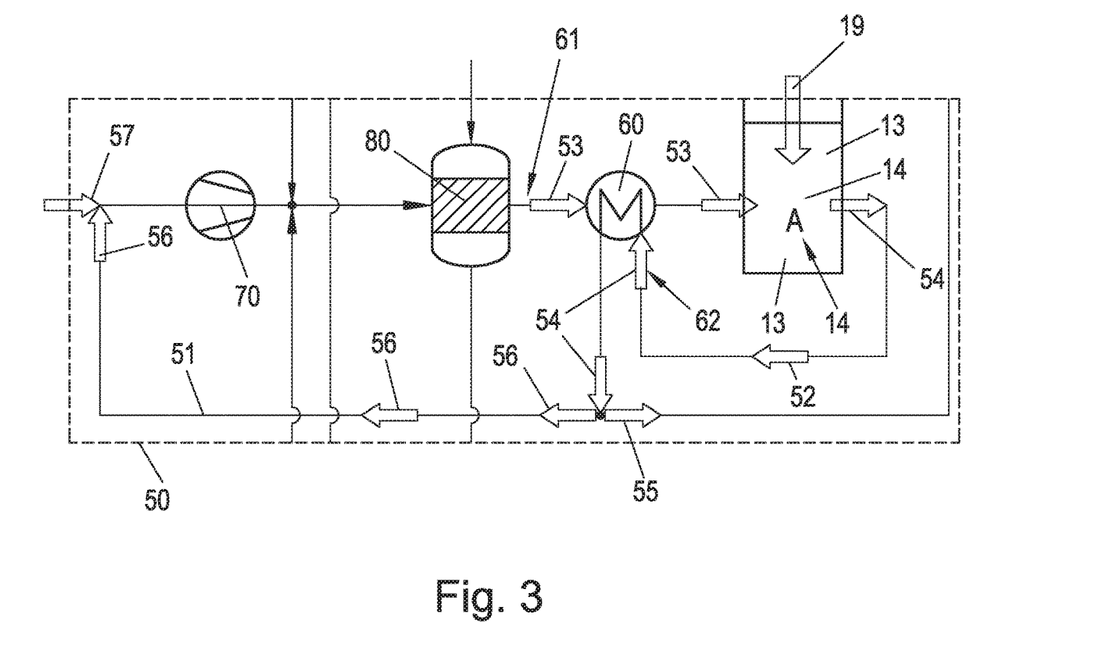
FIG. 3 a section of a method flow diagram of an inventive fuel cell system, whereby there is no additional pressure measuring apparatus in the anode gas circuit.

FIG. 3 shows a section of a method flow diagram of an inventive fuel cell system 1, whereby no additional pressure gauge is advantageously required in the anode gas circuit 50. The other components or assemblies required for operating the fuel cell system 1 correspond, for example, to the installation shown in FIG. 1. The differential pressure losses are measured in the anode gas circuit 50 shown in FIG. 3, for example according to the arrangement shown in FIG. 4.

Figure 4:
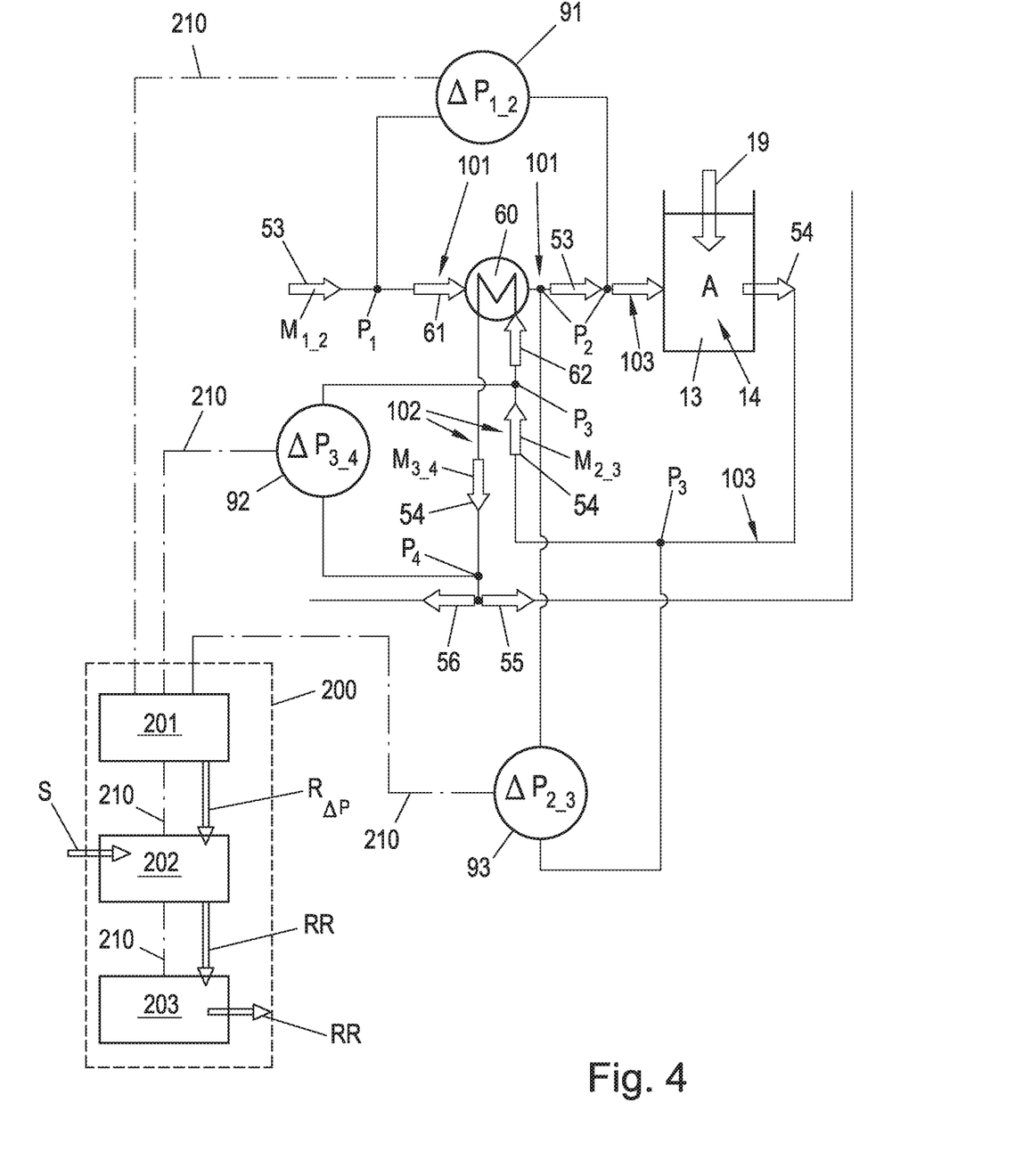
FIG. 4 in a detailed view of FIG. 3, an embodiment of an inventive measuring method with a measuring apparatus according to the invention.

FIG. 4 illustrates in a detailed view of FIG. 3 a version of an inventive measuring method with a measuring apparatus 200 according to the invention. For this purpose, the recirculation rate RR in the anode gas circuit 50 of a fuel cell system 1 is determined by the measuring apparatus 200 as follows:

With a first differential pressure loss measuring unit 91 a first differential pressure loss $\Delta P_{1\_2}$ is determined, the first differential pressure loss measuring unit 91 having two spaced apart pressure measuring points $P_1$, $P_2$, positioned along a first line section 101 of the anode gas recirculation line 51. A first mass flow $M_{1\_2}$ flows through this first line section 101 in the operating state of fuel cell system 1. The pressure measuring point $P_1$ is located in the anode gas supply line 53 upstream of the anode gas heat exchanger 60. The pressure measuring point $P_2$ is located in the anode gas outlet 54 downstream of the anode gas heat exchanger 60. The first differential pressure loss $\Delta P_{1\_2}$ is thus determined along a first line section 101 on the cold heat exchanger side 61 via the anode gas heat exchanger 60.

With a second differential pressure loss measuring unit 92 a second differential pressure loss $\Delta P_{3\_4}$ is determined, wherein the second differential pressure loss measuring unit 92 is positioned with two spaced apart pressure measuring points $P_3$, $P_4$ along a second line section 102 of the anode gas recirculation line 51. In the operating state of fuel cell system 1, a second mass flow $M_{3\_4}$ has flowed through the second line section 102, which here is larger than the first mass flow $M_{1\_2}$ of the first line section 101, since in the second mass flow $M_{3\_4}$, in addition to anode gas 52 in the anode gas supply line 53, the oxygen 19, which flows from cathode 12 into the anode space 13, must also be taken into account. An embodiment of the invention is thus carried out with a second mass flow that is larger than the first mass flow, whereby this ratio can be present at one, several or all pressure measuring points $P_1$, $P_2$, $P_3$, $P_4$. The pressure measuring point $P_3$ is located in the anode gas outlet 54 upstream of the anode gas heat exchanger 60. The pressure measuring point $P_4$ is located in the anode gas outlet 54 downstream of the anode gas heat exchanger 60.

The second differential pressure loss $\Delta P_{3\_4}$ is thus determined along a second line section 102 on the hot heat exchanger side 62 via the anode gas heat exchanger 60. Thus, the first $\Delta P_{1\_2}$ and the second differential pressure loss $\Delta P_{3\_4}$ are each determined via the cold 61 or the hot heat exchanger side 62 of the same anode gas heat exchanger 60.

A calculation unit 201 calculates a differential pressure loss ratio $R_{\Delta P}$ by dividing the ratio of measured second differential pressure loss $\Delta P_{3\_4}$ to measured first differential pressure loss $\Delta P_{1\_2}$. The respective recirculation rate RR is determined by an evaluation unit 202 on the basis of the differential pressure loss ratio $R_{\Delta P}$ calculated by the calculation unit 201 and on the basis of a characteristic system characteristic curve S of the fuel cell system 1 as a function of the respective calculated differential pressure loss ratio $R_{\Delta P}$ and this is displayed or output by a display unit 203.

Alternatively, the second differential pressure loss $\Delta P_{2\_3}$ may also be affected by differential pressure measurement with a second differential pressure loss measuring unit 93 positioned with two spaced apart pressure measuring points $P_2$, $P_3$ along a second or another line section 103 of the anode gas recirculation line 51. The pressure measuring point $P_2$ is again located in the anode gas outlet line 54 downstream of the anode gas heat exchanger 60. The pressure measuring point $P_3$ is located in the anode gas outlet line 54 upstream of the anode gas heat exchanger 60. Thus, this second differential pressure loss $\Delta P_{2\_3}$ is determined via the anode compartment 13 of the fuel cell 10. Again, a mass flow $M_{2\_3}$, which flows in the second or further line section 103, is larger than the first mass flow $M_{1\_2}$ in the first line section 101, whereby for further determination of the recirculation rate RR, this second differential pressure loss $\Delta P_{2\_3}$ is again compared with the first differential pressure loss $\Delta P_{1\_2}$ determined along the first line section 101.

Further measuring and/or control devices which may be necessary for carrying out the inventive measuring procedure with the measuring apparatus 200 or for automatic operation of the fuel cell system and which are not shown in FIG. 4 for reasons of clarity are known to the specialist in the field of fuel cells per se.

Figure 5:
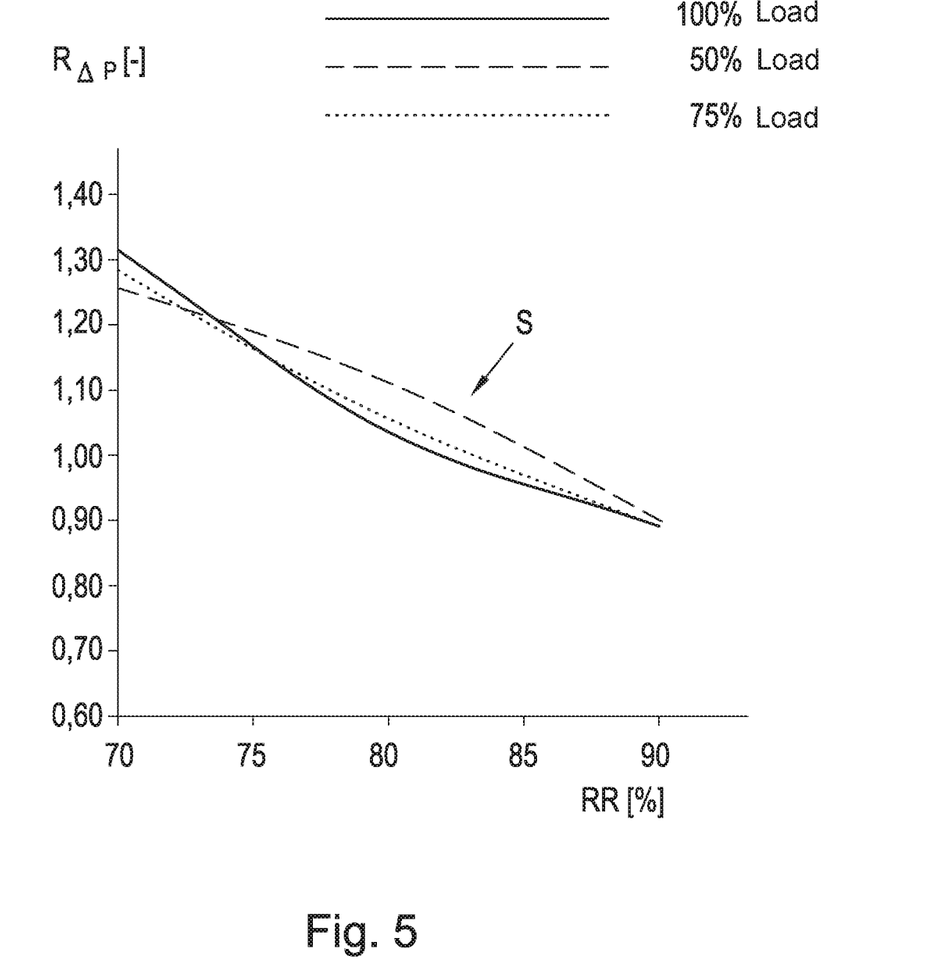
FIG. 5 in a diagram, the inventive measuring method for determining the recirculation rate in the anode gas circuit using a characteristic system characteristic curve of the fuel cell system as a function of the respective calculated differential pressure loss ratio.

FIG. 5 shows in a diagram the inventive measuring method for determining the recirculation rate RR in the anode gas circuit 50 using a characteristic system characteristic curve S characteristic for the respective fuel cell system 1 as a function of the respective calculated differential pressure loss ratio $R_{\Delta P}$. The characteristic system characteristic curve S, which indicates the correlation between the respective differential pressure drop ratio $R_{\Delta P}$ and the recirculation rate RR, is essentially independent of the current load, as the three data series, which were determined at 50%, 75% and 100% current load, prove. In order to further simplify the inventive measuring method, it can be assumed that the characteristic system characteristic curve S is independent of the current load, depending on the required accuracy, whereby in this case the characteristic system characteristic curve S is calibrated for a fuel cell system 1 by determining the differential pressure loss ratios $R_{\Delta P}$ at several different recirculation rates RR independent of the respective current load.

Alternatively, it can also be assumed that the characteristic system characteristic curve S indicates a linear correlation between the respective differential pressure drop ratio $R_{\Delta P}$ and the recirculation rate RR. In this case the calibration is further simplified and the determination of the differential pressure loss ratio $R_{\Delta P}$ at at least two different recirculation rates RR independent of the respective current load is sufficient. If the correlation between the respective differential pressure loss ratio $R_{\Delta P}$ and the recirculation rate RR is not linear but exponential, for example, the differential pressure loss ratios $R_{\Delta P}$ must be determined at at least three different recirculation rates RR.

What is claimed is:

1. A measuring method for determining the recirculation rate in the anode gas circuit of a fuel cell system and controlling accordingly a recirculation pump, wherein the fuel cell system comprises at least one fuel cell with at least one cathode arranged in a cathode chamber, with at least one anode arranged in an anode chamber and with an electrolyte present between cathode chamber and anode chamber, wherein an anode gas is supplied from the anode chamber to the at least one fuel cell with the recirculation pump via an anode gas recirculation line, and the anode gas is thermostated in at least one anode gas heat exchanger arranged in the anode gas recirculation line, wherein the method comprises following method steps:
measuring a first differential pressure loss along a first line section of the anode gas recirculation line; which first line section is passed through by a first mass flow in the operating state of the fuel cell system;
measuring a second differential pressure loss along a second line section of the anode gas recirculation line, which second line section is passed through by a second mass flow of different size compared to the first mass flow in the operating state of the fuel cell system;
calculating the differential pressure loss ratio by quotient formation of the ratio of measured second differential pressure loss to measured first differential pressure loss;
determining the recirculation rate in the anode gas circuit using a characteristic system characteristic curve of the fuel cell system as a function of the respective calculated differential pressure loss ratio;
controlling the recirculation pump according to the recirculation rate.

2. The measuring method according to claim 1, wherein the characteristic system characteristic curve as a correlation between the differential pressure loss ratio and the recirculation rate is essentially independent of a current load.

3. The measuring method according to claim 1, wherein the characteristic system characteristic curve indicates a linear correlation between the differential pressure loss ratio and the recirculation rate.

4. The Measuring method according to claim 1, wherein the differential pressure loss ratio decreases along the characteristic system characteristic curve with increasing recirculation rate.

5. The measuring method according to claim 1, wherein the characteristic system characteristic curve for a fuel cell system is calibrated by determining the differential pressure loss ratios ($R_{\Delta P}$) at different recirculation rates (RR).

6. The measuring method according to claim 1, wherein the first differential pressure loss along a first line section is measured in the anode gas supply line on the cold heat exchanger side of the at least one anode gas heat exchanger and the second differential pressure loss along a second line portion is measured in the anode gas recirculation line on the hot heat exchanger side of the same anode gas heat exchanger.

7. The measuring method according to claim 6, wherein the first differential pressure loss is measured in the anode gas supply line on the cold heat exchanger side upstream and downstream of the at least one anode gas heat exchanger and the second differential pressure loss is measured in the anode gas recirculation line on the hot heat exchanger side upstream and downstream of the same anode gas heat exchanger.

8. The measuring method according to claim 1, wherein the first differential pressure loss is measured in the anode gas supply line on the cold heat exchanger side upstream and downstream of the at least one anode gas heat exchanger and the second differential pressure loss is measured upstream and downstream of the anode chamber along a second line section of the anode gas recirculation line.

9. The measuring method according to claim 1, wherein anode gas is supplied to a reformer with the recirculation pump.

10. A measuring apparatus for performing a measuring method for determining the recirculation rate in the anode gas circuit of a fuel cell system according to claim 1, comprising at least one first differential pressure loss measuring unit for determining a first differential pressure loss which is measured with two spaced apart pressure measuring points, positioned along a first line section of an anode gas recirculation line, wherein in the operating state of the fuel cell system a first mass flow flows through the first line section, and
comprising at least a second differential pressure loss measuring unit for determining a second differential pressure loss which is measured with two spaced apart pressure measuring points, positioned along a second line section of the anode gas recirculation line, wherein in the operating state of the fuel cell system the second line section has been passed through by a second mass flow, which second mass flow is of different size to the first mass flow of the first line section, and
further comprising an arithmetic unit, wherein a differential pressure loss ratio can be calculated from the arithmetic unit by quotient formation of the ratio of measured second differential pressure loss to measured first differential pressure loss, and
further comprising an evaluation unit, wherein based on the calculated differential pressure loss ratio and a characteristic system characteristic curve of the fuel cell system as a function of the respective calculated differential pressure loss ratio the respective recirculation rate can be determined by the evaluation unit, which recirculation rate can be displayed by a display unit.

11. The measuring apparatus according to claim 10, wherein the arithmetic unit, the evaluation unit and the display unit are coupled together with signal lines.

12. The measuring apparatus according to claim 10, wherein the characteristic system characteristic curve can be calibrated for a fuel cell system by determining the differential pressure loss ratios at different recirculation rates.

13. The measuring apparatus according to claim 10, wherein the characteristic system characteristic curve can be selected with a correlation between the differential pressure loss ratio and the recirculation rate independent of a current load.

14. The measuring apparatus according to claim 10, wherein the characteristic system characteristic curve can be selected with a linear correlation between the differential pressure loss ratio and the recirculation rate.

15. The measuring method according to claim 2, wherein the characteristic system characteristic curve indicates a linear correlation between the differential pressure loss ratio and the recirculation rate.

16. The measuring apparatus according to claim 11, wherein the characteristic system characteristic curve can be calibrated for a fuel cell system by determining the differential pressure loss ratios at different recirculation rates.

* * * * *